United States Patent

[11] 3,617,692

| [72] | Inventor | Peter Landis<br>Urdorf, Switzerland |
|---|---|---|
| [21] | Appl. No. | 872,948 |
| [22] | Filed | Oct. 31, 1969 |
| [45] | Patented | Nov. 2, 1971 |
| [73] | Assignee | Albiswerk Zurich A.G.<br>Zurich, Switzerland |
| [32] | Priority | Nov. 21, 1968 |
| [33] | | Switzerland |
| [31] | | 17336/68 |

[54] THERMALLY CONTROLLED APPARATUS CELL
6 Claims, 1 Drawing Fig.

[52] U.S. Cl. .................................... 219/210,
219/501, 219/505
[51] Int. Cl. .................................... H05b 1/00
[50] Field of Search .......................... 219/200,
201, 209, 210, 218, 385–387, 391, 406–407, 436,
438, 501, 505, 510, 521

[56] References Cited
UNITED STATES PATENTS

| 1,029,230 | 6/1912 | Russell | 219/200 |
| 1,072,530 | 9/1913 | Thomson | 219/385 X |
| 1,692,547 | 11/1928 | Evans | 219/386 X |
| 2,576,874 | 11/1951 | Acton | 219/387 |

FOREIGN PATENTS

| 755,128 | 8/1956 | Great Britain | 219/387 |

Primary Examiner—C. L. Albritton
Attorney—Werner W. Kleeman

ABSTRACT: A novel apparatus cell in which the internal temperature thereof is maintained constant. The apparatus cell embodies a double-walled pot-shaped housing of heat conducting material with the hollow compartment between the double walls being filled with a heat-insulating material. A plate member also formed of a heat-conducting material and heated by a locally concentrated heat source serves to close the pot-shaped housing. A pot-shaped cover member also formed of heat conducting material having a collar-shaped marginal edge portion is provided, the cover member and particularly the edge portion thereof bearing upon the edge or marginal portion of the plate member. The space between the pot-shaped cover member and the plate member is at least partially filled with a heat insulating material. The apparatus cell of the instant invention provides a notable advantage in that only one heat source and one thermostat with an associated sensor is required, and, in the preferred inventive embodiment, the heat source comprises a transistor mounted upon the plate member, the transistor being connected in the final stage of a thermostat-control amplifier.

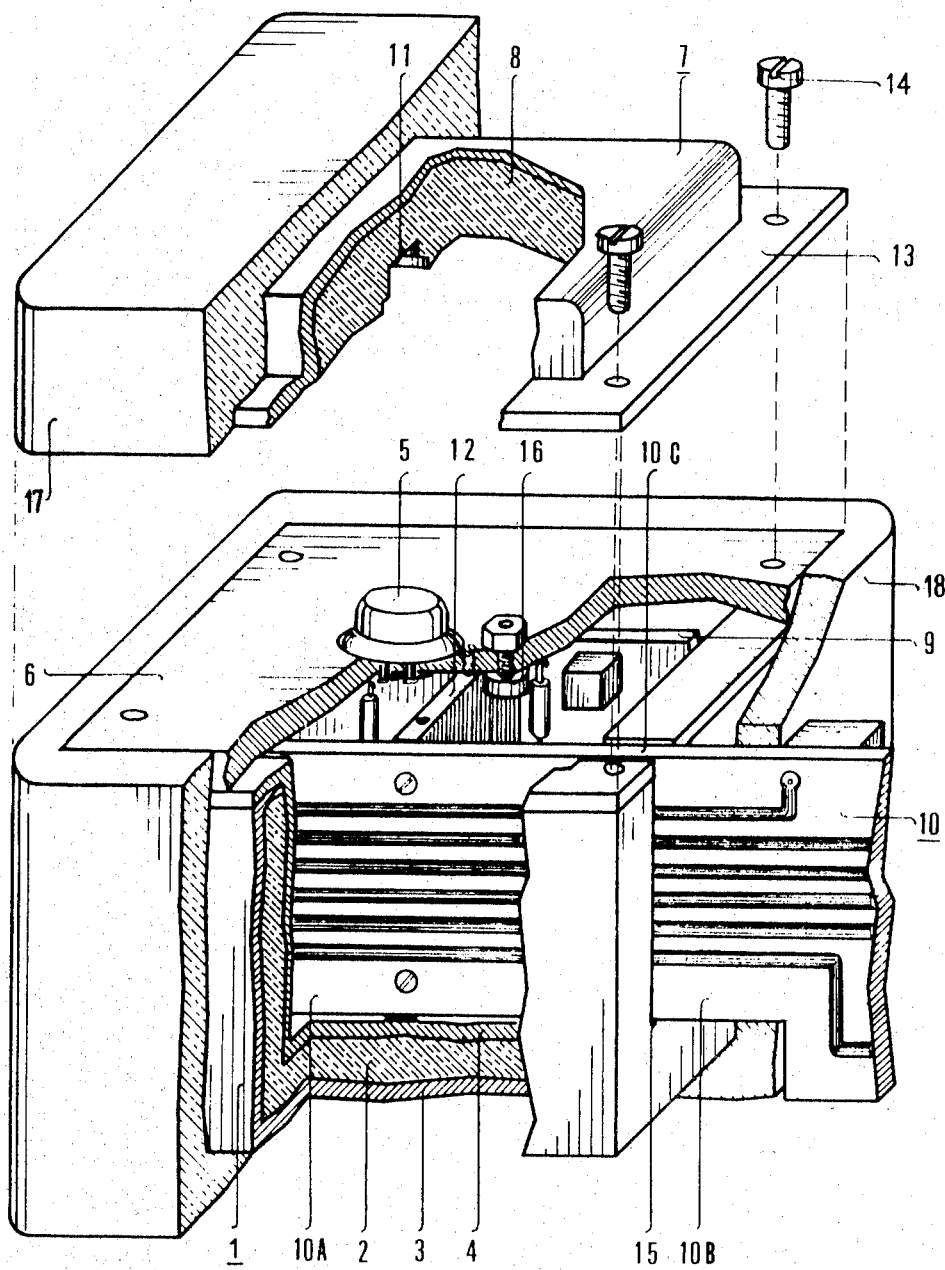

THERMALLY CONTROLLED APPARATUS CELL

BACKGROUND OF THE INVENTION

The instant invention generally relates to apparatus cells in which the internal temperature thereof is maintained constant, and particularly concerns an apparatus cell of the type wherein the wall of a housing which is enclosed in an insulating jacket is heated by means of a heat source controlled by an electronic thermostat.

It oftentimes is necessary to maintain certain electronic components and equipment at constant operating temperatures during use thereof, and, for this purpose, apparatus cells of the type above described are provided. Thus, for example, the frequency determining elements, such as quartz and the like, prevalent in very stable, highly constant oscillator circuits, are housed in an apparatus cell controlled by a thermostat. Similarly, for the purpose of maintaining a constant temperature of a so-called "dry junction" during measurements with thermoelements, such elements are likewise housed in apparatus cells controlled by a thermostat.

The known, prior art thermally controlled or regulated apparatus cells usually consist of a metallic housing which is enclosed in an insulating jacket, the walls of the housing being heated by a heat source. The temperature of the cell is determined by means of a sensor associated with the thermostat which is provided within the cell and, form this temperature determination, the setting value or the like is derived for the heat element.

When extremely accurate constant temperatures are desired to be attained, the prior art has proposed that a first such apparatus cell be mounted or installed in a larger, second apparatus cell, such that the external temperature of the inner cell will be maintained constant within a certain degree. The intermediate space or compartment between the inner cell and the outer cell is filled with a heat-insulating material such that both inner and outer cells are completely insulated from one another. Each of the cells includes a separate heat source as well as a separate thermostat with an associated sensor. Known double-apparatus cells of this type have the significant drawback in that two separate control and heating systems are required, this requirement, of course, necessitating a large expenditure.

SUMMARY OF THE INVENTION

With the above background in mind, it is a primary object of the instant invention to provide an improved thermally regulated apparatus cell which effectively overcomes the aforementioned drawbacks of prior art constructions.

Another, more specific yet equally important object of the instant invention concerns the provision of an improved apparatus cell in which, so as to maintain a constant internal temperature, the wall of a housing enclosed in an insulating jacket is heated by means of a heat source regulated by an electronic thermostat.

A further object of the instant invention relates to the provision of an improved double-apparatus cell wherein a constant internal temperature is maintained through the utilization of only a single-heat source and thermostat control therefor.

Now, to implement these and still further objects of the invention, which will become more readily apparent as the description proceeds, the novel apparatus cell of the instant invention is manifested by the features that such cell embodies a double-walled, pot-shaped housing of heat conducting material, the hollow compartment between the walls of the housing being filled with a heat-insulating material. A plate member also formed of heat-conducting material and heated by a locally concentrated heat source serves to close or seal the pot-shaped housing. A pot-shaped cover member also formed of heat conducting material is provided, the cover member having a collar-shaped marginal portion or edge which bears upon the edge or marginal portion of the plate. The inner space or compartment between the pot-shaped cover member and the plate member is at least partially filled with a heat-insulating material.

The apparatus cell of the instant invention provides a notable advantage over the prior art in that only one heat source and only one thermostat with an associated sensor is required. In accordance with a preferred, advantageous embodiment of the instant invention, the single-heat source comprises a transistor mounted upon the plate member of the cell, this transistor being connected in the final stage of the thermostat-control amplifier. Accordingly, with the instant invention, no special heating element is required.

BRIEF DESCRIPTION OF THE DRAWING

The invention will be better understood, and objects other than those set forth above will become apparent when consideration is given to the following detailed description thereof. Such description makes reference to the annexed drawing wherein the single FIG. therein depicts, in exploded schematic view, a preferred embodiment of the inventive apparatus cell.

DETAILED DESCRIPTION OF THE PREFERRED INVENTIVE EMBODIMENT

Now, by referring to the drawing, it will be seen that the apparatus cell illustrated therein consists of a double-wall, substantially pot-shaped housing 1 formed of metal and enclosed in an insulating jacket 18. Housing 1 is closed or sealed at the top thereof by a metal plate member 6. The hollow space or compartment 2 between walls 3 and 4 of the double-walled housing 1 is filled with a heat-insulating material such as polyurethane foam. Polyurethane foam has a low thermal conductivity of 0.018 Kcal/mh grd and thus serves as heat insulation. Plate member 6 bears at all sides thereof upon the upper end face of the housing 1 such that a good heat transition or transfer can take place between these components. A transistor 5 is mounted upon the plate member 6 and serves as a heat source. As will be explained hereinbelow, transistor 5 represents the final stage of the thermostat-control amplifier.

The novel apparatus cell is further seen to include a substantially pot-shaped cover member 7 formed of metal, the collar-shaped marginal edge 13 of which bears against the marginal edge of the plate member 6. The inner space or compartment 8 disposed between the cover member 7 and the plate 6 when the cover member is attached thereto, is likewise filled with a heat-insulating material such as polyurethane foam. This foam filling material is provided with a recess 11 which corresponds to the shape of the housing of transistor 5. Transistor 5 is thus tightly enclosed by the foam-filling material when the cover 7 is closed or placed upon the plate 6. Cover 7 and plate 6 are secured to one another and to housing 1 by means of screws 14 or equivalent fastening means. An insulating jacket is provided over the apparatus cell, such jacket preferably including two molded polyurethane foam portions, one such part or portion 17 enclosing the cover member 7, and the other such part or portion 18 enclosing the housing 1 as already discussed at the respective external sides of these members.

Continuing, it will be seen that, inside plate member 6 a threadably connected bridge member 12 is provided to which, at each end face thereof, an apparatus member 9 and 10A disposed at a printed circuit is secured. Apparatus member 9 represents an electronic thermostat, the final stage of the control amplifier thereof being provided by transistor 5.

A slot-shaped opening 15 is provided through housing 1 through which is disposed apparatus member 10 such that portions 10A and 10B thereof are respectively disposed inside and outside of the cell. The interconnection between both portions 10A and 10B of the apparatus member 10 is provided by a continuous printed circuit 10C. Due to this construction, it is possible to enclose certain portions 10A of the apparatus 10 inside the cell, whereas the remaining portions 10B remain outside the cell. Connections to the thermostat 9 are likewise provided for on the printed circuit 10C.

A sensor 16 is provided for the thermostat and desirably can consist of a commercially available thermistor, such as type K 252 (Siemens), which sensor is threaded onto the plate member 6.

The operational manner and mode of a heat source controlled by an electronic thermostat is well known to those versed in this art and therefore such operation does not require any further description. Accordingly, the following explanation will be limited to the overall operation of the apparatus cell.

In the illustrated preferred embodiment, plate member 6 is heated to a desired temperature by transistor 5 which serves as a locally concentrated heat source. The thickness of plate member 6 is such that the heat generated by transistor 5 is conducted up to the marginal edge portions of the plate member with practically no loss in temperature. Consequently, plate member 6 possesses the same temperature at all locations. The generated heat is transmitted through the marginal edge portions of the plate member 6 to cover member 7 and into the housing 1. The flow of heat continues at housing 1 along separate heat transfer or transport paths comprising the inner and outer walls 4 and 3 of housing 1, respectively. Additionally, a further heat transfer path exists in the bridge member 12 serves to deliver heat directly into the internal space or compartment of the cell itself.

If naturally occurring strongly fluctuating ambient outside temperatures are prevalent, external wall 3 of the cell is only maintained at an approximately constant temperature due to heat transport losses. Yet, the medium between the walls 3 and 4 is only subjected to small temperature fluctuations. The fluctuations of the heat transfer losses at the innner wall 4 are maintained so small that a constant temperature prevails in the inner space or compartment of the cell.

The delivery of heat through the bridge member 12 at locations of the cell removed from plate member 6 occurs without loss in contrast to the transport of heat via the walls 3 and 4. This additional inner heating surface therefore provides improved constant temperatures within the cell.

So as to heat both walls 3 and 4 by means of a common heat source, such heat source must satisfy the requirement that no internal losses exist. In other words, the temperature of the heat source must remain constant independent of the delivered quantity of heat. A heat source which meets these conditions comprises the transistor 5 with plate 6 which is regulated by a thermostat to a constant temperature.

The attachment of thermostat 9 as well as other apparatus parts 10A that are mounted in the cell to the bridge member 12 provides favorable results in two aspects. First of all, the heat is transmitted to the plate member 6 and directly to the apparatus parts or components 9 and 10A. Secondly, during the dismantling of the cell, it is possible to withdraw the entire contents of the cell by removing the cover. By virtue of the provision of cover 7, the fluctuating ambient or surrounding temperature is prevented from directly influencing the transistor.

As should now be apparent from the foregoing detailed description, the objects set forth at the outset to this specification have been successfully achieved. Accordingly,

I claim:

1. An apparatus cell comprising a double-walled pot-shaped housing means formed of heat-conducting material and defining a hollow space between the double walls of said double-walled pot-shaped housing means, heat-insulating material disposed in the hollow space between the walls of said double-walled housing means, an insulating jacket enclosing said housing means, a plate member formed of heat-conducting material disposed on said housing means for closing the same said plate member having a marginal edge, a locally concentrated heat source for heating said plate member, thermostat means for controlling said heat source, and a pot-shaped cover member formed of heat-conducting material, said cover member defining an inner compartment and a collar-shaped edge which bears upon the edge of said plate member, said inner compartment of said cover member being at least partially filled with heat-insulating material, and wherein said locally concentrated heat source means comprises a transistor disposed upon said plate member.

2. An apparatus cell as defined in claim 1, wherein said thermostat means comprises an electronic thermostat-control amplifier and wherein said transistor forms the final stage of said amplifier.

3. An apparatus cell as defined in claim 2 wherein said electronic thermostat-control amplifier is disposed in said apparatus cell.

4. An apparatus cell as defined in claim 3, wherein said plate member for closing said housing means has an inner side and wherein a bridge member of heat-conducting material is secured to said inner side of said plate member, said apparatus cell including additional component apparatus parts disposed therein and wherein said additional component apparatus parts and said electronic thermostat-control amplifier are secured to said bridge member.

5. An apparatus cell as defined in claim 4, further including slot-shaped opening means disposed through said insulating jacket and said double-walled housing means, printed circuit means disposed through said slot-shaped opening for providing a connection to said other component apparatus parts disposed inside said cell.

6. An apparatus cell comprising a double-walled pot-shaped housing means formed of heat-conducting material and defining a hollow space between the double walls of said double-walled pot-shaped housing means, heat-insulating material disposed in the hollow space between the double walls of said double-walled housing means, an insulating jacket enclosing said housing means, a plate member formed of heat-conducting material disposed on said housing means for closing said housing means, said plate member having a marginal edge, a pot-shaped cover member formed of heat-conducting material at least partially filled with heat-insulating material and having a collar-shaped edge bearing upon said marginal edge of said plate member, a locally concentrated heat source for heating each of said plate member, said double-walled housing means and said cover member, thermostat means for controlling said heat source, said plate member for closing said housing means further having an inner side, and wherein a bridge member of heat-conducting material is secured to said inner side of said plate member.